US008866827B2

(12) United States Patent
Zhou et al.

(10) Patent No.: US 8,866,827 B2
(45) Date of Patent: Oct. 21, 2014

(54) BULK-SYNCHRONOUS GRAPHICS PROCESSING UNIT PROGRAMMING

(75) Inventors: Kun Zhou, Beijing (CN); Hou Qiming, Beijing (CN); Baining Guo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1360 days.

(21) Appl. No.: 12/146,715

(22) Filed: Jun. 26, 2008

(65) Prior Publication Data

US 2009/0322769 A1     Dec. 31, 2009

(51) Int. Cl.
*G06T 1/00* (2006.01)
*G06F 9/45* (2006.01)
*G06F 9/44* (2006.01)
*G06F 9/52* (2006.01)

(52) U.S. Cl.
CPC *G06F 8/447* (2013.01); *G06F 8/31* (2013.01); *G06F 9/522* (2013.01)
USPC ........................................................ 345/522

(58) Field of Classification Search
USPC ........................................................ 345/522
See application file for complete search history.

(56) References Cited

U.S. PATENT DOCUMENTS

| | | | |
|---|---|---|---|
| 5,083,265 A | 1/1992 | Valiant | |
| 6,578,197 B1 | 6/2003 | Peercy et al. | |
| 6,763,519 B1 * | 7/2004 | McColl et al. | 718/100 |
| 6,825,843 B2 | 11/2004 | Allen et al. | |
| 2004/0207622 A1 | 10/2004 | Deering et al. | |
| 2004/0237074 A1 | 11/2004 | Aronson et al. | |
| 2005/0131865 A1 | 6/2005 | Jones et al. | |
| 2005/0140672 A1 | 6/2005 | Hubbell | |
| 2006/0082577 A1 | 4/2006 | Carter | |
| 2006/0107250 A1 | 5/2006 | Tarditi et al. | |
| 2008/0005547 A1 | 1/2008 | Papakipos et al. | |
| 2008/0010640 A1 | 1/2008 | Foo | |
| 2009/0259829 A1 * | 10/2009 | Grover et al. | 712/220 |

FOREIGN PATENT DOCUMENTS

WO    WO2007005739 A2    1/2007

OTHER PUBLICATIONS

International Search Report and Written Opinion Received for PCT Application No. PCT/US2009/048977, mailed on Feb. 9, 2010, 12 pages.
Stratton, et al., "MCUDA: An Efficient Implementation of CUDA Kernels on Multi-cores", IMPACT Technical Report, IMPACT-08-01, University of Illinois at Urbana-Champaign, Center for Reliable and High-Performance Computing, Mar. 12, 2008, 19 pages.

(Continued)

*Primary Examiner* — Hau Nguyen
(74) *Attorney, Agent, or Firm* — Dan Choi; Brian Haslam; Micky Minhas

(57) ABSTRACT

Described is a technology in a computing environment comprising a programming language for general purpose computation on a graphics processing unit (GPU), along with an associated compiler. A Bulk-Synchronous GPU Programming (BSGP) program is programmed to include barriers to describe parallel processing on GPUs. A BSGP compiler detects barriers corresponding to supersteps, converts BSGP programs to kernels based on the barriers, and combines them. During compilation, the compiler aligns barriers in the statements and bundles the corresponding supersteps together. A par construct is provided to allow the programmer to control aspects of bundling, e.g., by specifying a block independent statements. Thread manipulation emulation is provided to transparently emulate thread creation and destruction, with operations fork and kill. Also provided is remote variable access intrinsics for efficient communications between threads, and collective primitive operations.

20 Claims, 6 Drawing Sheets

(56) References Cited

OTHER PUBLICATIONS

Liao, et al., "Data and Computation Transformations for Brook Streaming Applications on Multiprocessors", In Proceedings of the 4th International Symposium on Code Generation and Optimization, Mar. 2006, pp. 196-207.

Nikolls, et al., "Scalable Parallel Programing with CUDA", ACM Queue, vol. 6, Issue 2, Mar./Apr. 2008, pp. 40-53.

Houston, Michael C., "A Portable Runtime Interface for Multi-Level Memory Hierarchies", Department Computer Science, Stanford University, Ph.D thesis, Mar. 2008, 129 pages.

Valiant, Leslie G., "A Bridging Model for Parallel Computation", Communications of the ACM, vol. 33, No. 8, Aug. 1990, pp. 103-111.

"NVIDIA CUDA Compute Unified Device Architechture", Programming Guide version 1.1, Nov. 29, 2007.

Dolbeau, et al., "HMPP: A Hybrid Multi-core Parallel Programming Environment", In the Proceedings of the Workshop on General Purpose Processing on Graphics Processing Units (GPGPU 2007), 2007, pp. 1-5.

Che, et al., "A Performance Study of General Purpose Applications on Graphics Processors", in First Workshop on General Purpose Processing on Graphics Processing Units, 2007, 10 pages.

Dokken, et al., "The GPU as a High Performance Computational Resource", in Proceedings of the 21st Spring Conference on Computer Graphics, SCCG'05, May 12-14, 2005, Budmerice, Slovakia, 7 pages.

Rumpf, et al., "Graphics Processor Units: New Prospects for Parallel Computing", vol. 51, Lecture Notes in Computational Science and Engineering, Springer-Verlag, 2005, pp. 1-46.

* cited by examiner

BULK-SYNCHRONOUS GRAPHICS PROCESSING UNIT PROGRAMMING

BACKGROUND

Contemporary commodity graphics hardware provides considerable raw processing power at a moderate cost. However, programming the GPU for general purpose computation is relatively difficult. In part this is because existing general-purpose GPU programming languages are based on the stream processing model, because GPUs are stream processors; such languages include Brook, Sh, and NVIDIA Corporation's CUDA.

Stream processing is a data centric model, in which data is organized into homogeneous streams of elements. Individual functions called kernels are applied to all elements of input streams in parallel to yield output streams. Complex computation is achieved by launching multiple kernels on multiple streams. This stream/kernel abstraction explicitly exposes underlying data dependencies.

However, while supplying high performance, the stream processing model makes general purpose GPU programming difficult for several reasons. For one, the program readability and maintenance is a big issue because programs are partitioned into kernels according to data dependencies, instead of functionalities. Adding a new functionality to an existing program usually involves rewriting many unrelated parts of the code. For another, dataflow in a complex application is rarely related to the underlying program logic due to extensive use of intermediate or temporary streams. Explicit dataflow management is therefore tedious and error prone.

Yet another reason for programming difficulty is that abstraction of parallel primitives is difficult, which hinders code reuse. More particularly, many parallel primitives, such as scan and sort, require multiple kernel launches. When such a primitive is called by a kernel, part of the primitive needs to be bundled with the caller to reduce intermediate stream size and kernel launch cost. The result is a primitive with broken integrity, which makes the abstraction of the primitive difficult.

Because of the above problems, it is extremely difficult to write even moderately complex general purpose programs using today's GPU programming languages. Any improvements to GPU programmability are thus highly desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology that provides and facilitates use of a programming language for general purpose computation on a graphics processing unit (GPU). A Bulk-Synchronous GPU Programming (BSGP) program, such as part of a system, is programmed to include barriers to describe parallel processing on GPUs.

In one aspect, a BSGP compiler detects barriers corresponding to supersteps, converts BSGP programs to kernels based on the barriers, and combines them. During compilation, the compiler aligns barriers in the statements and bundles the corresponding supersteps together, facilitating code reuse. A par construct is provided to allow the programmer to control aspects of bundling, e.g., by specifying a block of independent statements.

In one aspect, there is provided thread manipulation emulation to transparently emulate thread creation and destruction, with operations fork and kill. Also provided is remote variable access intrinsics for efficient communications between threads, and collective primitive operations.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a new GPU programming language for general purpose computation on the GPU, referred to herein as BSGP (bulk synchronous GPU programming). BSGP is based on a bulk synchronous parallel (BSP) model, which is a parallel programming model that abstracts from low-level program structures in favor of supersteps. A BSGP program thus comprises a sequential set of supersteps, in which each superstep is executed completely in parallel by a number of threads. As described herein, a barrier synchronization is performed at the end of each superstep to ensure steps are executed in sequential order with respect to each other.

As will be understood, BSGP is easy to read, write, and maintain. For example, a BSGP program looks similar to sequential C++ code, with only some additional extra information needed to describe parallel processing on GPUs. This is because unlike the kernels in stream processing, a superstep is not an individual function with explicitly specified input and output parameters, but rather resembles statements in traditional sequential programming, and is deduced semantically rather than enforced syntactically Another advantage of BSGP is that its data dependencies are defined implicitly because local variables are visible and may be shared across supersteps. Programmers are freed from tedious temporal dataflow management in stream programming. Further, with BSGP, a parallel primitive such as reduce, scan and sort may be called as a whole in a single statement, making the abstraction of primitives simple and thus facilitating code reuse.

As will be further understood, BSGP provides thread manipulation emulation by transparently emulating a set of thread manipulation features, specifically thread split and destruction, through operations including fork and kill. Also provided is a library of efficient primitive operations including reduce, scan and sort. Further described are language constructs to map BSP to GPU efficiently, including a requirement block and parallel block, to help overcome several incompatibility issues with respect to BSP and GPU.

While some of the examples described herein are directed towards various code listings, it is understood that these are non-limiting examples. Similarly, while a compiler is described in a CUDA-like environment, this is only one suitable environment. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and GPU programming in general.

Figure 1:
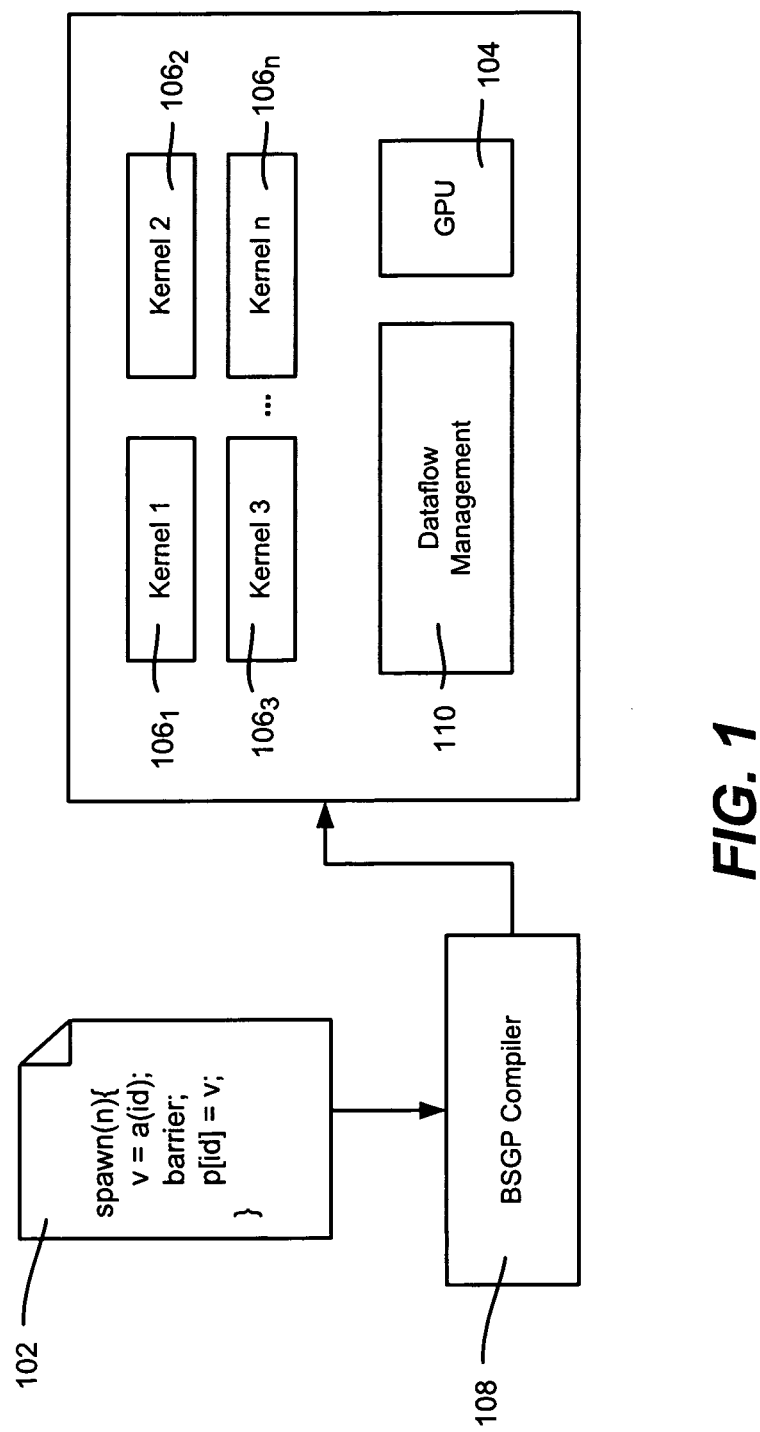
FIG. 1 is a block diagram representing example components in a computing (programming/compilation and/or runtime environment) in which a compiler automatically translates a BSGP program into stream kernels and generates management code for GPU execution.

Turning to the drawings, there is described BSGP, a programming language for general purpose computation on the GPU that is easy to read, write, and maintain. With BSGP, programmers only need to supply a small amount of extra information, referred to herein as the barriers, with a program 102, to describe parallel processing on a GPU 104. The statements between two barriers are automatically deduced as a superstep and translated into a GPU kernel $106_1$-$106_n$ by a BSGP compiler 108, as shown in FIG. 1. Each superstep is thus executed in parallel by a number of threads, with supersteps are delimited by barrier synchronizations to ensure proper parallel execution. Also shown in FIG. 1 is dataflow management code 110 produced by the compiler.

With respect to compiling, the BSGP programming model does not directly match the GPU's stream processing architecture, and thus the compiler 108 needs to convert BSGP programs to efficient stream programs. To build the compiler 108 requires consideration of barrier synchronization, in that while barriers can be directly implemented using hardware synchronization for coarse-grained parallel architectures, this is not possible in a stream environment. In the GPU's stream environment, it is common to create orders of magnitude more threads than can be executed simultaneously on physical processing units. Threads are dynamically distributed to available processing units for execution. Resources like registers for holding thread contexts are recycled upon completion. Synchronization of physical processing units does not affect non-executing threads, and is thus not equivalent to a (logic) barrier of threads. Waiting for all threads to finish could serve as a valid barrier, but this causes thread contexts to be destructed. To address this issue, the compiler 108 automatically adds context saving code to make the barrier conform to BSGP semantics, as described below.

Another compiler-related issue is generating efficient stream code. Because local variables are visible and shared across the supersteps in a BSGP program, the compiler 108 analyzes the data dependencies between supersteps and automatically allocates temporary streams to save local variable values at the end of a superstep, passing these temporary streams to the subsequent supersteps. To reduce the total number of temporary streams for efficient use of the (limited) video memory available on the GPU a graph optimization scheme is described herein. As a result of the sequential organization of supersteps, an optimal solution may be obtained in polynomial time.

Turning to a consideration of BSGP versus stream processing, one difference between BSGP and stream processing is that BSGP and stream processing are different forms of SPMD (single program multiple data) processing, in which a number of threads execute the same program in parallel. The total number of threads is called thread size. Each thread is given a rank, e.g., a unique integer from 0 to size −1, which distinguishes it from other threads.

Figure 2A:
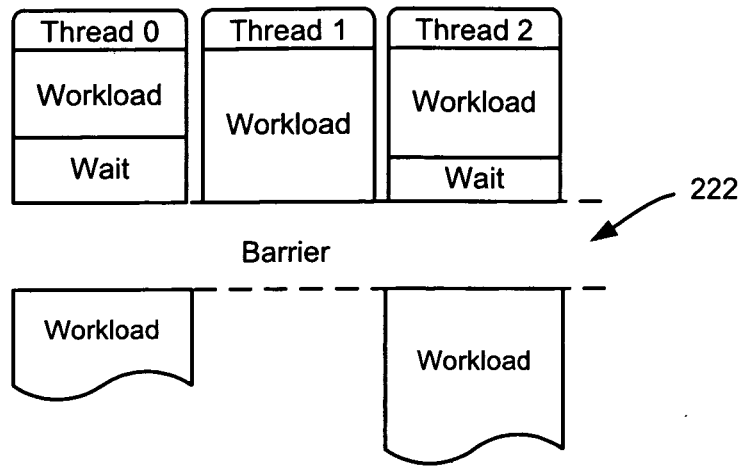
FIG. 2A is a representation of a construct showing a barrier operation among threads.

A barrier is a form of synchronization in SPMD programming. When a barrier is reached, execution is blocked until all threads reach the same barrier, as generally represented by barrier 222 in FIG. 2A which makes thread 0 and thread 2 wait until thread 1 completes its workload. In stream processing, waiting for a kernel launch to terminate is the only form of barrier; (note that a kernel launch is traditionally called a pass in GPU programming). Although CUDA-capable hardware supports local synchronization, a barrier of all threads cannot be achieved within a kernel in general.

Another aspect is a collective operation, comprising an operation that has to be performed simultaneously by all threads. In SPMD programming, a collective operation is syntactically similar to an ordinary sequential operation, except that it operates on all threads semantically. The input of one thread may affect the output of other threads.

Figure 2B:
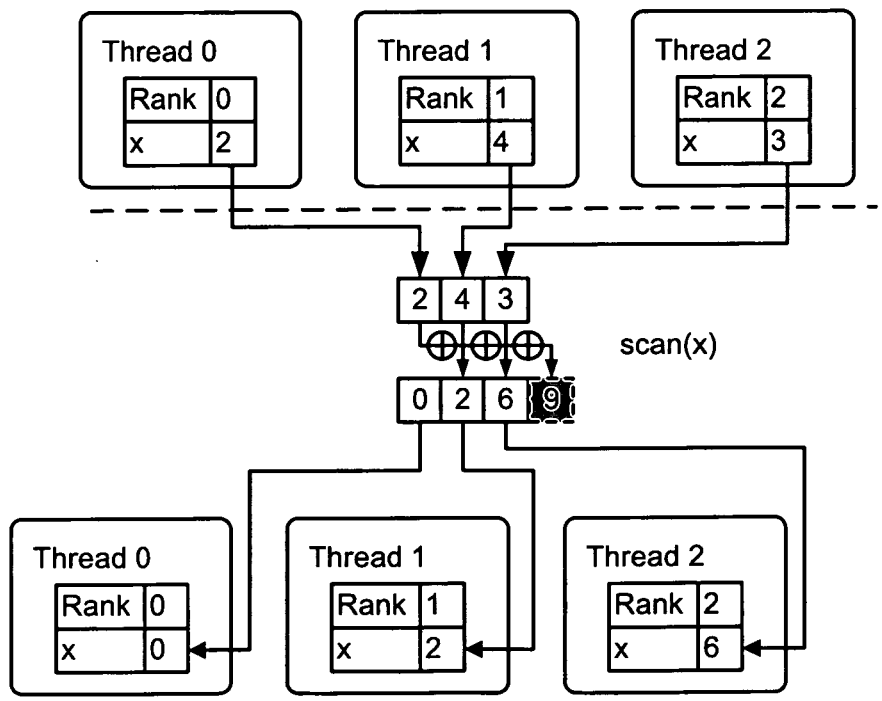
FIG. 2B is a representation of a construct showing collective operation among threads.

For example, consider FIG. 2B, in which a collective prefix sum may be defined as scan(x), and x's values in threads (Thread 0, Thread 1 and Thread 2) are collected to form a vector. After a barrier synchronization, represented by the dashed line in FIG. 2B, the prefix sum is computed using the vector. The prefix sum result is then redistributed to each thread's x, and the code execution continues. Typical collective operations require barriers internally and thus are relatively rare in stream programming.

By way of a source code example, consider solving the following problem: given a triangle mesh's connectivity, compute a list of the one-ring neighboring triangles for each vertex. The mesh contains m vertices and n triangles. Connectivity is given as an array of 3n integers ranging from 0 to m−1, with each three consecutive integers representing the three vertex indices of a triangle.

Example BSGP source code for solving this problem is based on a sorting algorithm. More particularly, the above problem is solved by sorting, in which each triangle is triplicated and associated with its three vertices. The triplicated triangles are sorted using the associated vertex indices as the sort key. After sorting, triangles sharing the same vertex are grouped together to create a concatenated list of all vertices' neighboring triangles. Each sort key is then compared to its predecessor's to compute a pointer to the beginning of each vertex's list:

Listing 1 Find Neighboring Triangles (BSGP Version):

```
/*
input:
    ib: pointer to element array
    n: number of triangles
output:
    pf: concatenated neighborhood list
    hd: per-vertex list head pointer
temporary:
    owner: associated vertex of each face
*/
findFaces(int* pf, int* hd, int* ib, int n){
    spawn(n*3){
```

```
            rk = thread.rank;
            f = rk/3; //face id
            v = ib[rk]; //vertex id
            thread.sortby(v);
            //allocate a temp list
            require
                owner = dtempnew[n]int;
            rk = thread.rank;
            pf[rk] = f;
            owner[rk] = v;
            barrier;
            if(rk==0||owner[rk-1]!=v)
                hd[v] = rk;
        }
    }
```

Listing 1 is an implementation of the above sorting algorithm using BSGP. The spawn statement creates 3n threads on the GPU to execute the enclosed statements. The primitive 'thread.sortby' is a rank adjusting primitive which reassigns thread ranks to match the order of sort keys, as described in the example primitives, below. This primitive preserves each sort key's correspondence with other data. To compare a sort key with that of a predecessor, the sort keys are stored in a temporary list owner. After a barrier synchronization, the predecessor's sort key is then gathered from the list and a comparison is performed to yield each vertex's head pointer. This program matches the algorithm description step by step, similar to traditional sequential programming.

By way of contrast, Listing 2 exhibits a CUDA (stream processing) implementation of the same algorithm, written using a known sort routine. Note that both programs are for demonstrating programming styles and neither is optimized for performance. Due to the lack of a more flexible sort, triangle and vertex IDs are packed together into the sort key. The program contains three kernels: before_sort prepares sort key for calling CUDPP, after sort unpacks the sorting result and fills the concatenated list of neighboring triangles, and finally make head computes head pointers. The findFaces function launches these kernels, calls the sorting primitive, and maintains temporary streams. Compared with the CUDA version, the BSGP implementation is much easier to read, write and maintain.

Listing 2 Find Neighboring Triangles (CUDA Version)

```
#include "cudpp.h"
const int szblock=256;
_global_ void
before_sort(unsigned int* key,int* ib,int n3){
    int rk=blockIdx.x*szblock+threadIdx.x;
    if(rk<n3){
        key[rk]=(ib[rk]<<16u)+rk/3;
    }
}
_global_ void
after_sort(int* pf,int* owner,unsigned int* sorted,int n3){
    int rk=blockIdx.x*szblock+threadIdx.x;
    if(rk<n3){
        int k=sorted[rk];
        pf[rk]=(k&0xffff);
        owner[rk]=(k>>16u);
    }
}
_global_ void
make_head(int* hd,int* owner,int n3){
    int rk=blockIdx.x*szblock+threadIdx.x;
    if(rk<n3){
        int v=owner[rk];
        if(rk==0||v!=owner[rk-1])
            hd[v]=rk;
    }
}
/*
interface is the same as BSGP version
temporary streams:
    key: sort keys
    sorted: sort result
    temp1: used twice for different purpose
        1. temporary stream 1 for cudppSort
        2. associated vertex of each face (owner)
    temp2: temporary stream 2 for cudppSort
*/
void findFaces(int* pf,int* hd,int* ib,int n){
    int n3=n*3;
    int ng=(n3+szblock-1)/szblock;
    unsigned int* key;
    unsigned int* sorted;
    int* temp1;
    int* temp2;
    cudaMalloc((void**)&key,n3*sizeof(unsigned int));
    cudaMalloc((void**)&sorted,n3*sizeof(unsigned int));
    cudaMalloc((void**)&temp1,n3*sizeof(int));
    cudaMalloc((void**)&temp2,n3*sizeof(int));
    before_sort<<<ng,szblock>>>(key,ib,n3);
    //call the CUDPP sort
    {
        CUDPPSortConfig sp;
        CUDPPScanConfig scanconfig;
        sp.numElements = n3;
        sp.datatype = CUDPP_UINT;
        sp.sortAlgorithm = CUDPP_SORT_RADIX;
        scanconfig.direction = CUDPP_SCAN_FORWARD;
        scanconfig.exclusivity = CUDPP_SCAN_EXCLUSIVE;
        scanconfig.maxNumElements = n3;
        scanconfig.maxNumRows = 1;
        scanconfig.datatype = CUDPP_UINT;
        scanconfig.op = CUDPP_ADD;
        cudppInitializeScan(&scanconfig);
        sp.scanConfig = &scanconfig;
        cudppSort(sorted, key, temp1, temp2, &sp, 0);
        cudppFinalizeScan(sp.scanConfig);
    }
    after sort<<<ng,szblock>>>(pf,temp1,sorted,n3);
    make head<<<ng,szblock>>>(hd,temp1,n3);
    cudaFree(temp2);
    cudaFree(temp1);
    cudaFree(sorted);
    cudaFree(key);
}
```

As can be seen, the CUDA source code in Listing 2 is divided into several kernels. Data flow is explicitly specified via parameter passing, and temporary streams are allocated to hold parameter values, resulting in a larger code size. Conversely, the BSGP version in Listing 1 is written as a single compact procedure via the use of barriers and collective operations. From the programmer's perspective, local variables are visible across barriers, and no explicit parameter passing is needed. The actual data flow is deduced by the compiler when the stream code is generated. Temporary streams are automatically allocated and freed by the compiler when appropriate.

The CUDA source code in Listing 2 is divided into several kernels. Data flow is explicitly specified via parameter passing, and temporary streams are allocated to hold parameter values, resulting in a larger code size. On the other hand, the BSGP version is written as a single compact procedure through the use of barriers and collective operations. From the programmer's perspective, local variables are visible across barriers, and no explicit parameter passing is needed. The actual data flow is deduced by the compiler when the stream code is generated. Temporary streams are automatically allocated and freed by the compiler when appropriate.

Figure 3A:
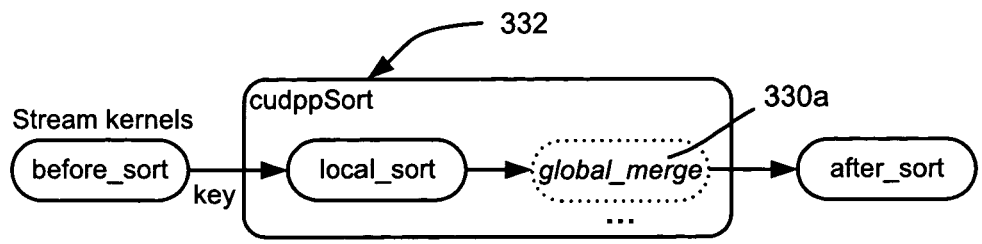
FIG. 3A is a representation of source code reuse in a stream programming model

In general, source code reuse has been a serious problem in traditional GPU development. In a stream environment, a method that requires multiple kernels, like sorting, is typically reused as a CPU wrapper function, because kernel launch is not possible inside another kernel. One such example is the cudppSort in Listing 2. It performs a local_sorting pass and a number of global merging passes on the input stream. Under such a setting, sort key preparation and local_sorting are done in two separate passes, as illustrated in FIG. 3A. Note that FIG. 3A exemplifies source code reuse in the stream model, versus FIG. 3B which exemplifies source code reuse in the in the BSP model. For simplicity, the internals of global merge passes are omitted and treat it as a single function 330A and 330b1 and 330b2. In the CUDA Listing 2, sort is called through CPU wrapper cudppSort. Three kernels and a temporary stream key are used. Conversely, in the BSGP code of Listing 1, after inline expansion, local_sort is bundled with the preceding code in findFaces. Two kernels are generated and a key is unnecessary.

As shown in FIG. 3A, a temporary stream is allocated to pass the sort key. Note that the key preparation before_sort and local_sorting local_sort can actually be bundled in a single kernel without using a temporary stream for the sort key. Separating them results in an extra kernel launch and an extra stream, however, which is inefficient. Although it is possible to do the bundling manually, doing so requires local_sort to be separated from the cudppSort method. This violates information hiding, and considerably hinders source code reuse.

Figure 3B:
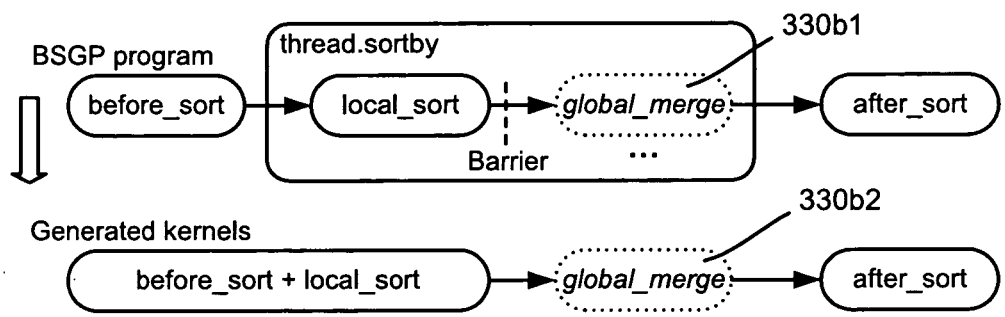
FIG. 3B is a representation of source code reuse in a bulk-synchronous programming model.

In contrast, the BSP model of FIG. 3B allows barrier synchronization within a program, making collective functions possible. In an inlined collective function containing barriers, all code before the first barrier belongs to the preceding superstep by definition. The same may be applied to code after the last barrier. Bundling is thus achieved automatically.

Turning to aspects related to source code maintenance, to improve the performance of stream programs, programmers usually strive to manually bundle source code as tightly as possible in a single kernel even though these programs are semantically unrelated. For example, in FIG. 3A, before_sort and local_sort can be bundled in a single kernel. However, such manual bundling will cause maintenance issues. For example, adding a function call in a stream program requires the surrounding kernel to be split into two. Rescheduling function calls and computation in other kernels requires all affected kernels to be refactorized to reflect the new data flow. Removing calls requires surrounding kernels to be merged to avoid performance degradation. Additional stream management code also needs to be updated manually throughout the above process. These difficulties considerably hinder source code maintenance.

In contrast, with BSGP, multi-superstep algorithms may be abstracted as collective functions. Being syntactically identical, a collective function call such as thread.sortby(x) can be manipulated like an ordinary function call. The needed modifications to the final stream program are automatically made by the compiler 108 (FIG. 1).

The compilation of a BSGP program into stream processing code requires implementing barrier synchronization, as mentioned above. However, the stream processing model decouples physical processing units and logical threads, which differs from traditional time-slicing thread management in that not all threads are executed simultaneously. Instead, threads are dynamically distributed to available processing units. Resources (e.g., registers) for holding thread contexts are recycled upon thread completion. For these reasons persistent logical thread contexts do not physically exist and thus cannot be taken for granted as in previous BSP implementations To address this issue, the compiler 108 is designed such that it generates additional context saving code when compiling a BSGP program for stream processors. With respect to performance, the context saving code produced by the compiler is comparable or better than hand-written temporary stream management programs. Note that the time needed to load and store variables depends mostly on the memory bandwidth and is not much affected by code generation. Based on this observation, the BSGP 108 compiler focuses on minimizing the total amount of stored values, where a value refers to the evaluation result of an assignment's right-hand side. The strategy is that a value is saved if and only if it is used in supersteps following its defining superstep. The BSGP compiler 108 may also carry out other optimizations, such as elimination of dead code and conditional constant propagation to further reduce saved values.

Another technical issue is directed towards minimizing peak memory consumption. The practice of simply allocating one stream for each stored value would quickly exhaust the memory for any problem size of practical interest. The total number of allocated temporary streams has to be minimized under two constraints, namely that one temporary stream has to be allocated for each saved value, and values that may be used simultaneously cannot be assigned the same stream.

The problem is dealt with somewhat analogous to the register allocation problem in compiler theory, with temporary streams being registers. More particularly, because supersteps are organized sequentially, an optimal solution is computed in polynomial time using graph optimization.

Yet another aspect is locality, in that contemporary GPUs rely on locality to achieve high performance. Severe performance penalties apply if threads with neighboring physical ranks perform heterogeneous tasks, e.g., accessing non-coherent memory addresses. Therefore, it is desirable to adjust thread ranks so as to match physical locality with algorithmic locality.

To this end, the BSP model is extended by introducing rank reassigning barriers, barrier(RANK REASSIGNED). Because physical thread ranks cannot be changed within a kernel, a logical rank reassignment is performed by shuffling stored thread contexts at a barrier.

Figure 4:
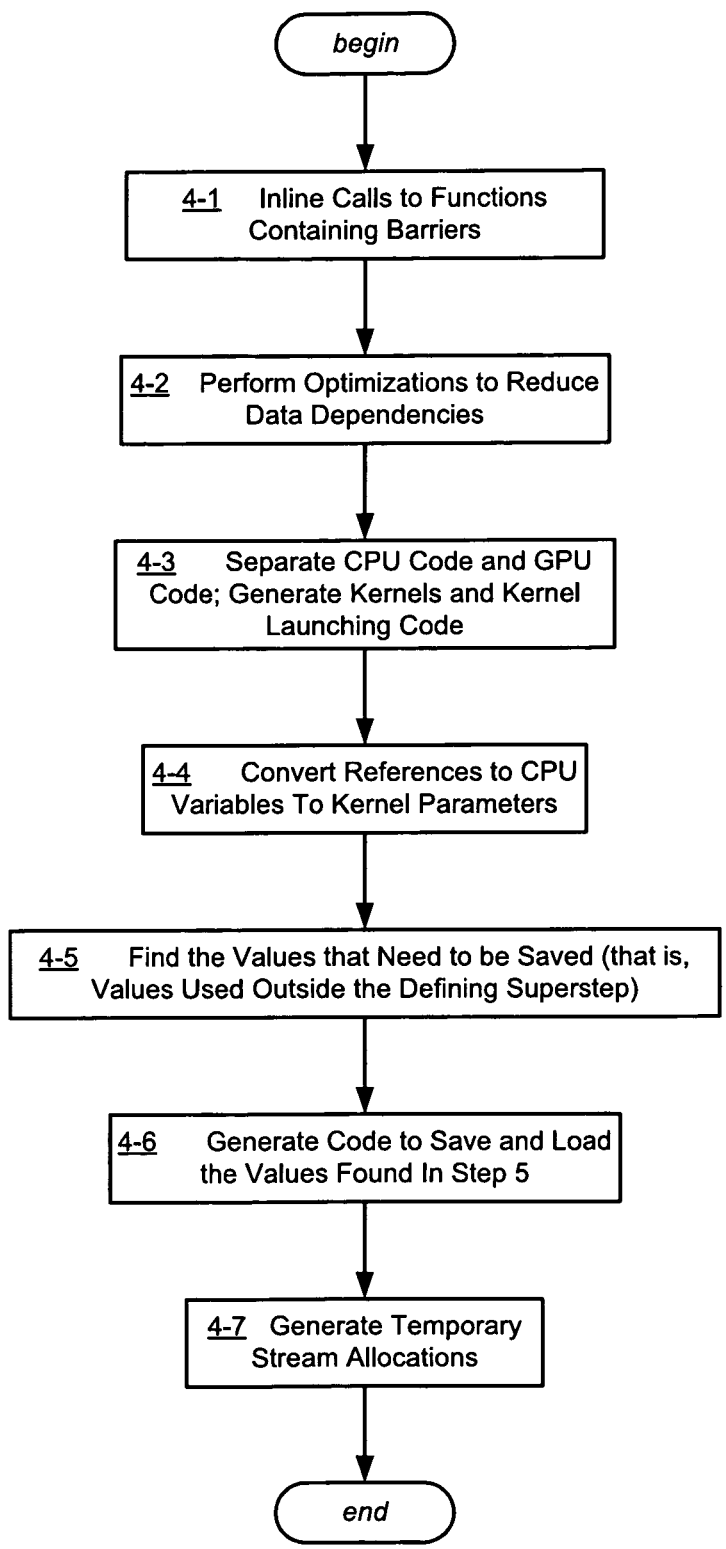
FIG. 4 is a flow diagram showing example steps taken to compile a BSGP program.

A BSGP program is translated by a compilation algorithm to a stream program via the following steps, also represented in FIG. 4:

4-1. Inline all calls to functions containing barriers.

4-2. Perform optimizations to reduce data dependencies.

4-3. Separate CPU code and GPU code. Generate kernels and kernel launching code.

4-4. Convert references to CPU variables to kernel parameters.

4-5. Find all values that need to be saved, i.e., values used outside the defining superstep.

4-6. Generate code to save and load the values found in Step 5.

4-7. Generate temporary stream allocations.

Listing 3 is the pseudocode of the BSGP program after executing Step 1 on the program in Listing 1, i.e., expanding the inline function thread.sortby, which contains two supersteps and uses barrier(RANK REASSIGNED) to reassign thread ranks. Listing 4 is the pseudocode of the final generated stream program. Listing 3 illustrates the above compiling steps.

Listing 3 Extended Version of Listing 1 by Expanding the Inline Function thread.sortby:

```
findFaces(int* pf, int* hd, int* ib, int n){
    spawn(n*3){
        //superstep 1
        rk0 = thread.rank;
        f = rk0/3; v = ib[rk0];
        //BEGIN OF thread.sortby
        //allocate an internal temporary stream
        require
        sorted id = dtempnew[thread.size]int;
        local_sort(sorted id, v);
        barrier(RANK REASSIGNED);
        require
        global merge(sorted id);
        //superstep 2
        //internal implementation of rank reassigning
        thread.oldrank = sorted id[thread.rank];
        //END OF thread.sortby
        //allocate a temp list
        require
        owner = dtempnew[n]int;
        rk1 = thread.rank;
        pf[rk1] = f;
        owner[rk1] = v;
        barrier;
        //superstep 3
        if(rk1==0||owner[rk1-1]!=v)
            hd[v] = rk1;
    }
}
```

Step 2 performs classical compiler optimizations on the BSGP program to prevent unused variables or variables holding constant values from being saved and thus reduces context saving costs. One scheme used is that of constant propagation, with which constant values are propagated through assignments. In a BSGP program, thread.rank is a constant value in supersteps where it is not reassigned. Therefore, in Listing 3, rk1 can be replaced by thread.rank, preventing it from being unnecessarily saved to memory.

Dead code elimination is another scheme that may be employed. It eliminates all source code not contributing to the program's output. Cross-superstep data dependencies in dead code may be eliminated using this optimization.

In Step 3, the BSGP program is split into a sequential set of supersteps according to barriers. For each superstep, a kernel is created that contains the code in this superstep. In the spawning function, spawn blocks are replaced by corresponding kernel launching code. CPU code inserted via a require block is placed before the containing kernel's launching code.

Step 4 deduces the parameters that need to be passed to GPU kernels from the CPU. This is done by assuming all variables that are accessed at least once by both CPU and GPU are parameters. Kernel prototype and launching code are then generated, and parameter access in BSGP code is converted to specific instructions. Writes to parameters are disallowed and reported as compiling errors.

Step 5 finds for each value its defining superstep by locating its corresponding assignment. It then enumerates all uses of this value to see whether it is used in a different superstep. The value has to be saved if such a use exists.

In Step 6, the analysis result of Step 5 is used to generate the actual value saving and loading code. For each value, the value saving code is generated at the end of its definition superstep, and the value loading code is generated at the beginning of each utilization superstep. Table 1 summarizes the data dependency analysis result of Listing 3:

TABLE 1

|  | Value | | | |
| --- | --- | --- | --- | --- |
|  | f | v | rk0 | rk1 |
| Definition Step | 1 | 1 | 1 | 2 |
| Utilization Steps | 2 | 2, 3 | 1 | 2 |
| Save | yes | yes | no | No |

To support rank reassigning barriers, the value loading code generated above needs to be modified. In general, this operates by performing a logical rank reassignment by shuffling stored thread contexts at a barrier. Each thread sets thread.oldrank to its previous rank after a barrier(RANK REASSIGNED), as shown in Listing 3. The compiler then moves the value loading code to immediately after the thread.oldrank assignment, and thread.oldrank is used when addressing the temporary stream. Values used in subsequent supersteps are loaded in a similar manner and moved to newly allocated temporary streams using reassigned ranks. Subsequent supersteps may then proceed using new ranks. This is illustrated in pass2 in Listing 4:

Listing 4 Pseudocode of Final Stream Program for Listing 3:

```
kernel pass1(int* ib, int* sorted id, int* t0, int* t1){
    //superstep 1
    f = thread.rank/3; v = ib[thread.rank];
    local_sort(sorted_id, v);
    t0[thread.rank] = f; //value saving
    t1[thread.rank] = v; //value saving
}
kernel pass2(int* sorted id, int* pf, int* owner,
        int* t0, int* t1, int* t2){
    //superstep 2
    thread.oldrank = sorted id[thread.rank];
    //context shuffling for rank reassinging
    //load values from previous superstep using oldrank
    f = t0[thread.oldrank];
    v = t1[thread.oldrank];
    pf[thread.rank] = f;
    owner[thread.rank] = v;
    //v is moved to temporary stream t2 using new rank
    t2[thread.rank] = v;
}
kernel pass3(int* hd, int* owner, int* t2){
    //superstep 3
    v = t2[thread.rank]; //value loading
    if(thread.rank==0||owner[thread.rank-1]!=v)
        hd[v] = thread.rank;
}
findFaces(int* pf, int* hd, int* ib, int n){
    thread.size = n*3;
    sorted id = dtempnew[thread.size]int;
    t0 = _newstream(thread.size);
    t1 = _newstream(thread.size);
    //launch superstep 1
    launch(thread.size,
            pass1(ib, sorted id, t0, t1));
    global_merge(sorted id);
    owner = dtempnew[n]int;
    t2 = _newstream(thread.size);
    //launch superstep 2
    launch(thread.size,
            pass2(sorted id, pf, owner, t0, t1, t2));
    _freestream(t1);
    _freestream(t0);
    //launch superstep 3
    launch(thread.size,
            pass3(hd, owner, t2));
    freestream(t2);
    //free lists allocated by dtempnew
    _dtempfree( );
}
```

Also, in step 7, temporary streams are generated and assigned to saved values. A graph optimization algorithm is used to minimize peak memory consumption. More particularly, the minimization of peak memory consumption is exemplified via the BSGP program shown in Listing 5. Table 2 lists the values to be saved in Listing 5, that is, the data dependency analysis result of Listing 5.

Listing 5 Testing Program for Memory Optimization.

```
void test(int* a){
    spawn(1){
        //superstep 1
        v0 = a[0]; v1 = a[1];
        barrier;
        //superstep 2
        v2 = v0+v0;
        barrier;
        //superstep 3
        v3 = v1+v2;
        barrier;
        //superstep 4
        v4 = v3+v1;
        a[i] = v4;
    }
}
```

TABLE 2

|  | Value | | | |
| --- | --- | --- | --- | --- |
|  | v0 | v1 | v2 | v3 |
| Definition Step | 1 | 1 | 2 | 3 |
| Utilization Steps | 2 | 3, 4 | 3 | 4 |

Figure 5A:
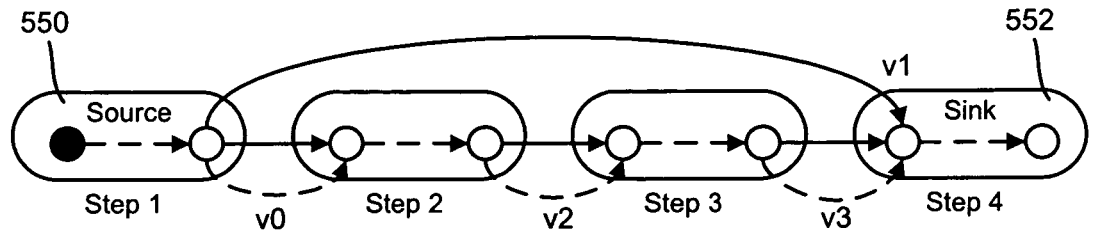
FIGS. 5A-5C are representations of graph building used to facilitate minimum flow for temporary stream optimization.
Figure 5B:
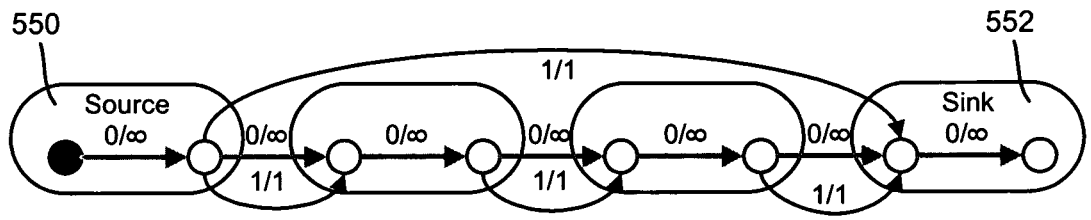
Figure 5C:
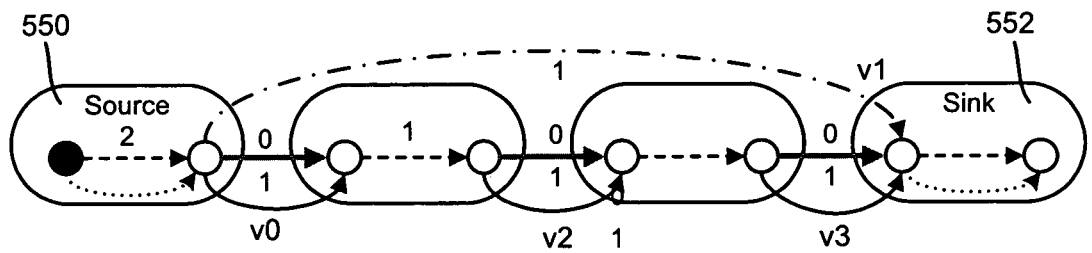

A directed acyclic graph is built for all supersteps and saved values according to Table 2. FIGS. 5A-5C show minimum flow for temporary stream optimization, in which nodes corresponding to the same superstep are grouped in grey boxes.

As shown in FIG. 5A, for each superstep, two nodes are created, namely one for the beginning of the superstep's execution and the other for the end. These nodes are connected by two kinds of edges. First, each node is connected to its succeeding node in execution order by a non-value edge. Second, for each saved value, the end node of its definition superstep is connected to the beginning node of its last utilization superstep by a value edge. The beginning node of the first superstep is denoted as the source 550, and the end node of the last superstep as the sink 552.

An allocated temporary stream can then be mapped to a path from the source to the sink by connecting the value edges for all values assigned to the stream with non-value edges. The dashed path in FIG. 5A is an example. Minimizing the number of allocated temporary streams is equivalent to covering all value edges using a minimal number of paths from the source to the sink, i.e., a minimum flow in the graph, which is a classical graph theory problem and the optimal solution can be computed in polynomial time.

To apply the minimum flow algorithm, each value edge is assigned a minimal flow requirement of one and a capacity of one. Each nonvalue edge is assigned with a minimal flow requirement of zero and a capacity of +1. The resulting graph is drawn in FIG. 5B. The minimum flow for FIG. 5B is shown in FIG. 5C. The corresponding temporary stream allocation allocates v0, v2, v3 in one stream and v1 in another stream, as shown in the dashed, dotted, or dash/dotted paths.

One example compiler was implemented in the CUDA GPU stream environment (although other stream environments may have been used, as the compilation algorithm does not rely on CUDA-specific features). In this example, the compilation of a BSGP program includes the following stages:
1. The source code is compiled to static single assignment form (SSA).
2. The algorithm of FIG. 4 is carried out on each spawn block's SSA form.
3. Generated kernels are translated to CUDA assembly code, on which the CUDA assembler is applied. The resulting binary code is inserted into the CPU code as a constant array, and CUDA API calls are generated to load the binary code.
4. The object file or executable is generated from the CPU code by a conventional CPU compiler.

The SSA representation was chosen mainly for simplification of the data dependency analysis. Since there is only one assignment for each SSA variable, the concept of value as defined above is equivalent to that of an SSA variable, and this considerably simplifies data dependency analysis. Operating on SSA also allows directly generating optimized assembly code without calling CUDA's built-in high-level compiler, and thus reduces compilation time significantly. CUDA-specific optimizations, such as register allocation and instruction scheduling, are not sacrificed because a majority of them are handled in the assembler.

In addition to its stream environment, CUDA offers additional features including local communication and cached memory read. Taking advantage of these features provides efficient implementation of many parallel primitives including scan. Note that the above-described compilation algorithm does not handle flow control across barriers; however in stream processing, a control processor is available for uniform flow controls and the need for such barriers is reduced.

BSGP is a C-like language with special constructs (described herein) dedicated for BSP programming on the GPU, including constructs related to GPU programming, including spawn and barrier: As illustrated in Listing 1, a spawn statement executes a block of GPU code using the total number of threads as a parameter. A barrier synchronization is indicated by a barrier statement. A barrier may appear directly in BSGP code or in functions inlined into BSGP code. Another type of barrier, barrier(RANK REASSIGNED), is a special type of barrier for reassigning thread ranks as described below.

The language facilitates cooperation with the CPU using a "require" construct. In stream processing, certain crucial operations such as resource allocation and detailed kernel launch configuration are only available to the control processor. To address this issue, control processor code may be inserted into BSGP source code as a require statement block. At run time, code inserted this way is executed before the containing superstep is launched.

To reduce barriers, a par construct may be used. The BSGP compilation algorithm bundles the first superstep of a function with its caller. This can sometimes leads to suboptimal results because of the sequential order of BSGP supersteps. Listing 6 provides an example. In both sort idx(A) and sort idx(B), the local_sort part is to have been bundled into the superstep that generates A and B.

Listing 6 Pseudo Code of Sort idx and a Program that Computes Sort Index for Two Values.

```
inline int sort_idx(int x){
    require
        sorted_id = dtempnew[n]int;
    local_sort(sorted id, x);
    barrier;
```

```
        require
            global_merge(sorted id);
            return sorted_id[thread.rank];
    }
    sorter(int n){
        spawn(n){
            A = functionA( );
            B = functionB( );
            idxA = sort_idx(A);
            idxB = sort_idx(B);
            //more code
        }
    }
```

However, the example compiler simply inlines the sort idx code and yields three supersteps as follows:

```
    sorter(int n){
        spawn(n){
            A = functionA( );
            B = functionB( );
            //first sort idx
            require
                sorted_idA = dtempnew[n]int;
                local_sort(sorted_idA, A);
            barrier;
            require
                global_merge(sorted idA);
                idxA = sorted idA[thread.rank];
            //second sort idx
            require
                sorted_idB = dtempnew[n]int;
                local_sort(sorted_idB, B);
            barrier;
            require
                global_merge(sorted_idB);
                idxB = sorted idB[thread.rank];
            //more code
        }
    }
```

In theory it is possible for a compiler to automatically deduce that sort idx(B) is independent of the first sort sort idx(A). In practice, routines like sort idx often use low-level features such as local communication extensively, making the deduction extremely difficult. For this reason, the par construct is provided to let the programmer control the bundling behavior by restructuring the code. A par may be used in Listing 6 to reduce one pass as shown in Listing 7:

Listing 7 Par Example

```
    sorter(int n){
        spawn(n){
            A = functionA( );
            B = functionB( );
            par{
                idxA = sort_idx(A);
                idxB = sort_idx(B);
            }
            //more code
        }
    }
```

Figure 6:
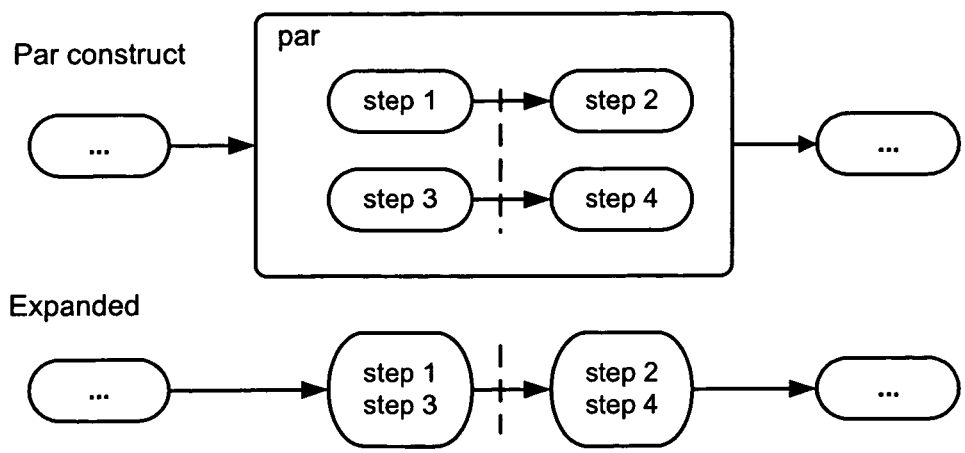
FIG. 6 shows a representation of a par construct showing barrier alignment and merging.

The par construct specifies that all statements in the following block are independent of each other. During compilation, the compiler aligns barriers in the statements and bundles the corresponding supersteps together as illustrated in FIG. 6. More particularly, FIG. 6 represents the par construct, in which barriers between step 1,2 and 3,4 are aligned. Corresponding passes are then merged.

After inline expansion and par expansion, Listing 7 yields an optimized result with two supersteps:

```
    sorter(int n){
        spawn(n){
            A = functionA( );
            B = functionB( );
            //the two sorts in par
            require
                sorted_idA = dtempnew[n]int;
                local_sort(sorted_idA, A);
            require
                sorted_idB = dtempnew[n]int;
                local_sort(sorted_idB, B);
            barrier;
            require{
                global_merge(sorted_idA);
                global_merge(sorted_idB);
            }
            idxA = sorted_idA[thread.rank];
            idxB = sorted_idB[thread.rank];
            //more code
        }
    }
```

The par construct has the limitations of neither including any optimization nor allowing more detailed control over superstep bundling. Nevertheless, par can handle simultaneous independent calls to the same collective function, which is what typically occurs in applications.

Turning to aspects related to emulating thread manipulation, (particularly fork and kill), for applications that involve data amplification/reduction, it is desirable to create/destroy threads to improve load balancing as the application data is amplified/reduced. In coarse-grain parallel programming, thread manipulation is accomplished by primitives such as fork and kill. Current GPUs do not support these thread manipulation primitives; only the total number of threads is specified at a kernel launch. To address this problem, an emulation of thread manipulation is provided through a set of collective APIs using a multi-superstep algorithm. Listing 8 illustrates the thread manipulation APIs using the sample code for extracting numbers from different regions of a plain text file, in which utility routines are omitted for simplicity. Listing 8 Number Extraction. Utility Routines are Omitted for Simplicity.

```
    /*
    extract numbers from plain text
    input:
        begin/end: offset to begin/end of regions
        n: number of regions to parse
    returns:
        parsed numbers
    */
    float* getNumbers(int* begin, int* end, int n){
        float* ret = NULL;
        spawn(n){
            id = thread.rank;
            s = begin[id]; e = end[id];
            pt = s+thread.fork(e-s+1);
            c = charAt(pt-1); c2 = charAt(pt);
            thread.kill(isDigit(c)||!isDigit(c2));
            require
                ret = dnew[thread.size]float;
                ret[thread.rank] = parseNumber(pt);
        }
        return ret;
    }
```

Initially, a thread is spawned for each region. The thread forks an additional thread for each character in the region. All threads except those corresponding to the first letter of a number are killed. Remaining threads proceed to extract the number and write the result to a newly allocated list. Additional details of fork and kill are set forth in the example primitive operations, below.

Thread manipulation is implemented by adjusting thread.size in the require block and reassigning thread ranks. No additional compiler intervention is needed.

With respect to communication Intrinsics (thread.get and thread.put), BSGP also supports remote variable access intrinsics for thread communication.

thread.get(r, v) gets v's value in the previous superstep from the thread with rank r. If r is not a valid rank, an undefined result is returned.

thread.put(r, p, v) stores v's value to p in the thread with rank r. The stored value can only be read after the next barrier. If r is not a valid rank, no operation is performed. put is considered to be an assignment to p.

Handling communication intrinsics in the BSGP compiler is straightforward. Note that communication intrinsics are used together with a barrier. This implies that the affected variable is used across the barrier, and a temporary stream has already been allocated. Each communication operation is then converted to a read/write on the stream, using the source/target thread rank as the index. Also, in the case of a thread.put, the default saving code for the affected variable is removed.

Using communication routine thread.get, it is feasible to further simplify the BSGP program in Listing 1. As shown in Listing 9, thread.get is used to get the preceding thread's sort key by fetching v's value before the barrier from thread rk-1. With this simplification the temporary list owner is removed.
Listing 9 Find Neighboring Triangles (BSGP Updated Version Using Communication)

```
findFaces(int* pf, int* hd, int* ib, int n){
    spawn(n*3){
        rk = thread.rank;
        f = rk/3;           //face id
        v = ib[rk];         //vertex id
        thread.sortby(v);
        rk = thread.rank;
        pf[rk] = f;
        barrier;
        if(rk==0||thread.get(rk-1,v)!=v)
            hd[v] = rk;
    }
}
```

Example BSGP Primitive Operations

Also described herein is a library of parallel primitives as collective functions. These primitives are entirely implemented in the BSGP language without special compiler intervention. Programmers may write new primitives with similar interfaces. Currently, three kinds of BSGP primitives are provided, namely data parallel primitives, rank adjusting primitives and thread manipulation primitives.

Data parallel primitives include:
reduce(op, x): Collective reduction of x using operator op. The returned value is the reduction result. op has to be associative, such as max, min and +;
scan(op, x): Collective forward exclusive scan of x using associative operator op. Scan result overwrites x. The returned value is the reduction result as a byproduct;
compact(list, src, keep, flag): Collective stream compaction. Each src whose keep is true is compacted and appended to list. flag specifies whether list is to be cleared before appending;
split(list, src, side, flag): Collective stream splitting. Every src is split according to side into two pieces, which are then appended to list, with the false piece preceding the true one. flag has similar semantic as in compact;
sort idx(key): Collective sorting and index returning. Let Ki be key in thread with rank i and ri be sort idx's return value. Then ri satisfies $K_{ri}\_K_{rj}$ for i_j;

Supported rank adjusting primitives include:
thread.split(side): Split threads. The rank is reassigned such that a thread with a false side has a smaller rank than a thread with a true side. Relative rank order is preserved among threads of the same side;
thread.sortby(key): Collective rank reassignment sorting. Let $K_i$ be key in thread with rank i. Thread ranks are adjusted such that after thread.sortby returns, $K_i \leq K_j$ for all i≤j. Relative rank order is preserved among threads with the same key, i.e., the sort is stable;

Supported thread manipulation primitives include:
thread.kill(flag): Kill the calling thread if flag is true;
thread.fork(n): Fork n child threads. All child threads inherit the parent's local variables. A unique ID between 0 and n-1 is returned to each child thread. The parent thread no longer exists after fork.

Note that both fork and kill reassign resulting threads' ranks to numbers in the range of 0 . . . thread.size-1 while preserving parent threads' relative rank order.

Figure 7:
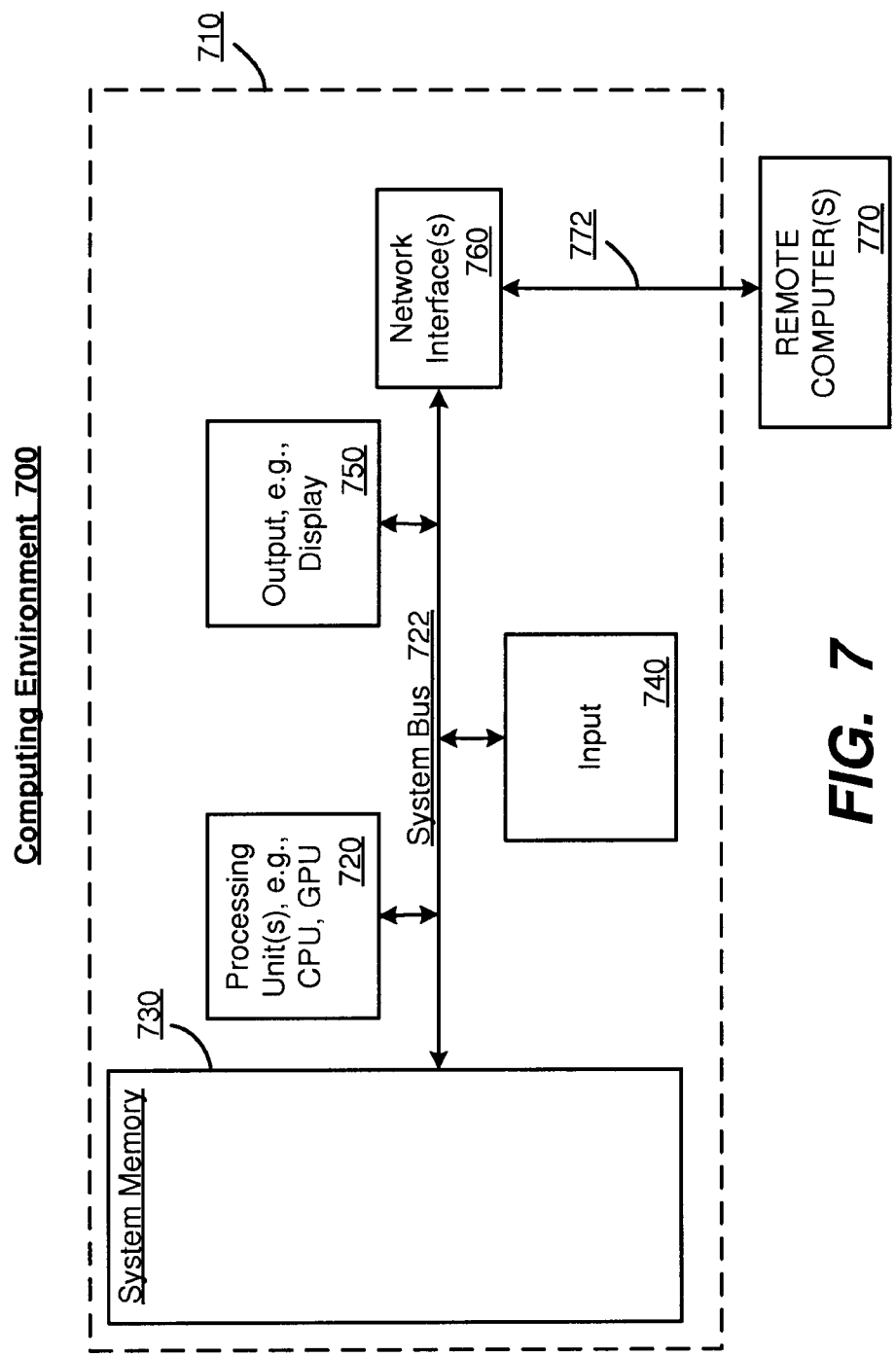
FIG. 7 shows an example representation of a suitable computing system environment.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720, such as a graphics processing unit (GPU) and/or an equivalent thereof.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

As can be seen, among the advantages of BSGP is that programmers are freed from the tedious chore of temporary stream management. In a BSGP program, data dependencies are defined implicitly because local variables are visible and shared across supersteps. BSGP makes the abstraction of parallel primitives simple and thus facilitates source code reuse. With BSGP, a parallel primitive such as reduce, scan and sort can be called as a whole in a single statement.

Additional features of BSGP include thread manipulation emulation to transparently emulate thread manipulation features, including thread creation and destruction, with operations fork and kill, which are extremely useful in parallel programming but are missing in existing GPU programming languages. Further, BSGP allows remote variable access intrinsics for efficient communications between threads, and provides collective primitive operations, e.g., via a library of straightforward collective primitive operations including reduce, scan and sort.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising: detecting barriers in a bulk synchronous program, each barrier delimiting supersteps; and compiling the supersteps into stream code kernels for execution by the graphics processing unit.

2. The method of claim 1 wherein compiling the supersteps comprises adding code to save thread context at each barrier.

3. The method of claim 1 wherein compiling further comprises combining at least some of the kernels using allocated temporary streams.

4. The method of claim 3 wherein using the allocated temporary streams comprises employing a graph optimization scheme.

5. The method of claim 1 further comprising, providing a spawn statement that executes a block of GPU code using a total number of threads as a parameter.

6. The method of claim 1 further comprising, providing a require construct for inserting control processor code into a containing superstep for executing the control processor code before launching the containing superstep.

7. The method of claim 1 further comprising, providing a par construct for use in the bulk synchronous program to specify a block of independent statements.

8. The method of claim 1 further comprising, providing a set of primitives for use in the bulk synchronous program.

9. The method of claim 8 wherein providing the set of primitives comprises providing data parallel primitives, rank adjusting primitives, or thread manipulation primitives, or any combination of data parallel primitives, rank adjusting primitives, or thread manipulation primitives.

10. The method of claim 8 wherein providing the set of primitives comprises providing a reduce primitive, a scan primitive, a compact primitive, a split primitive or a sort primitive, or any combination of reduce, scan, compact, split or sort primitives.

11. The method of claim 8 wherein providing the set of primitives comprises providing a primitive to split threads, a primitive to sort threads, or both a primitive to split threads and a primitive to sort threads.

12. The method of claim 8 wherein providing the set of primitives comprises providing a primitive to kill a thread, a primitive to fork a thread, or both a primitive to kill a thread and a primitive to fork a thread.

13. The method of claim 1 wherein compiling the supersteps comprises, inlining calls to functions containing barriers, performing optimizations to reduce data dependencies, separating CPU code and GPU code and generating kernels and kernel launching code, convert references to CPU variables to kernel parameters, finding values used outside a defining superstep and generating code to save and load those values, and generating temporary stream allocations.

14. In a computing environment, a system comprising, a compiler that processes source code for a bulk synchronous program, including statements, constructs and primitives, into stream kernels based on barrier synchronization, aligns barriers in the code, and combines the kernels into code that is configurable for execution by a graphics processing unit.

15. The system of claim 14 wherein one of the statements comprises a barrier statement for delimiting supersteps in the source code, and wherein one of the constructs comprises a require construct for inserting control processor code into a containing superstep in the source code, the compiler compiling the source code so as to execute instructions corresponding to the control processor code before launching instructions corresponding to the containing superstep.

16. The system of claim 14 wherein the primitives include a reduce primitive, a scan primitive, a compact primitive, a split primitive or a sort primitive, a primitive to split threads, a primitive to sort threads, a primitive to kill a thread or a primitive to fork a thread, or any combination of a reduce primitive, a scan primitive, a compact primitive, a split primitive or a sort primitive, a primitive to split threads, a primitive to sort threads, a primitive to kill a thread or a primitive to fork a thread.

17. The system of claim 14 wherein the compiler combines at least some of the kernels by allocating temporary streams.

18. One or more computer-readable memory having computer-executable instructions, which when executed perform steps, comprising, providing a bulk synchronous programming language, including statements, constructs and primitives for execution on one or more processing units, including a statement that delineates synchronization barriers to define a sequential set of supersteps, a construct for inserting control processor code into a containing superstep for executing the control processor code before launching the containing superstep, and at least one primitive to manipulate thread operations.

19. The one or more computer-readable memory if claim 18 having further computer-executable instructions comprising, compiling source code written at least in part in the programming language into stream code kernels and dataflow management code, and executing code corresponding to the stream code kernels and dataflow management code in a graphics processing unit.

20. The one or more computer-readable memory if claim 18 having further computer-executable instructions comprising, compiling source code written at least in part in the programming language into stream code kernels, and adding code to save thread context when changing between stream code kernels.

* * * * *